United States Patent Office 2,856,303
Patented Oct. 14, 1958

2,856,303

GAMMA-RAY ABSORPTIVE GLASS

William H. Armistead, Corning, N. Y., assignor to Corning Glass Works, Corning, N. Y., a corporation of New York No Drawing. Application March 1, 1954
Serial No. 413,477

8 Claims. (Cl. 106—53)

This invention relates to glasses capable of absorbing gamma-radiation and suitable for windows in concrete protective walls for observing the manipulation of radioactive substances by remote control. It is particularly concerned with new transparent glasses having a density and an absorptive capacity comparable with those of "heavy" concrete, which differs from ordinary concrete in that it contains aggregates of barytes (barium sulfate) or iron ore and has a density of about 3.2 as compared with a density of about 2.5 for ordinary concrete.

Heretofore such a protective wall has been composed of ordinary concrete provided with an observation window usually comprising a radiation-absorptive transparent glass cell of requisite thickness containing a 78% aqueous solution of zinc bromide and composed of a conventional barium silicate glass having a density of about 2.7 and containing $CeO_2$ to prevent undue darkening of the glass by the gamma-radiation with a resultant loss of its visible transmission. The possibility of the sudden loss of the zinc bromide solution from such a window by accidental breakage of the glass constitutes a very serious hazard involving the fatal exposure of the observer, if only for a fraction of a second, to the harmful radiation. Moreover, the zinc bromide solution tends to decompose with the formation of view-obstructing gas bubbles, if the gamma-radiation exceeds a certain critical level. To avoid such difficulties, the observation window may be composed entirely of such $CeO_2$-containing glass.

As the intensity and/or the amount of radiation increases, it is necessary to correspondingly increase the thickness of the protective wall to provide the necessary protection. To obtain such protection without an undue increase in the thickness of the protective wall, such wall can be formed of "heavy" concrete, in which case it is also desirable to utilize a glass having a density and an absorption for gamma-radiation comparable with those of heavy concerete and transparent advantageously in thicknesses up to 5 feet or more. Unfortunately, however, no glass heretofore known is capable of meeting such requirements. Conventional high-density silicate glasses containing PbO or PbO and BaO, which oxides are particularly absorptive of gamma radiation, and containing sufficient $CeO_2$ to prevent objectionable darkening and loss of transmission might be expected to be particularly adapted for a window for such purpose. The inherent coloring effect of $CeO_2$ in glass is not only especially pronounced in such glasses, however, but the transmission through a thickness of 3 feet or more of such a glass containing $CeO_2$ for wave lengths of maximum visible luminosity, approximately 5500 Angstroms, is too low to permit satisfactory vision therethrough. Any substantial reduction of the $CeO_2$ content to lessen such coloration results in a more objectionable darkening of the glass by the gamma-radiation.

I have now discovered that, surprisingly, such a high density glass can be employed satisfactorily for this purpose provided that it contains 17% to 25% of total alkali metal oxide of which at least 10% is $K_2O$. Basically such glasses consist essentially of 35 to 50% $SiO_2$, 17 to 25% of alkali metal oxide including at least 10% $K_2O$, at least 15% and preferably 25 to 45% PbO, and 0.8 to 1.8% $CeO_2$ free of oxides of neodymium and praseodymium, the total of the essential constituents being at least 90%. Such glasses have densities ranging from about 2.9 to 4.0.

As is well known, the other alkali metal oxides commonly used in glass-making, namely, $Na_2O$ and $Li_2O$, possess a greater fluxing power than $K_2O$ and, when substituted for $K_2O$, serve to improve the meltability of the glass and to lower its softening point. (By softening point is meant that temperature at which the viscosity of a glass is $10^{7.6}$ poises.) The glass may, therefore, also contain as essential constituents up to 15% $Na_2O$ and/or up to 3% $Li_2O$ provided that the total alkali metal oxide content does not exceed 25%. In such case the $K_2O$ content can be as low as 10% so long as the total alkali metal content is at least 17%.

BaO also imparts to glass a substantial absorption for gamma-radiation; and I find that it can be included in the new glass in an amount up to 25% as an essential constituent and a partial substitute for PbO in which case such PbO may be as low as 15% provided that the total of such divalent metal oxides is at least 25% and not over 45%.

Optionally the glass may also contain up to 5% CdO, up to 10% SrO, up to 5% ZnO, up to 10% CaO, and/or up to 5% MgO provided that the total of all divalent metal oxides including PbO and BaO does not exceed 45%, the total PbO and BaO being at least 25%. While the presence in the glass of CdO, SrO, ZnO, CaO, and/or MgO in quantities not exceeding the stated amounts does no harm, such oxides also have no particular beneficial effect. Such oxides when present in excessive amounts, however, have an adverse effect upon the color or transmission of the glass and upon its density. The presence of up to 5% $Al_2O_3$ or up to 10% $B_2O_3$ for improving the chemical and physical durability or meltability of the glass is also optional.

Preferably the glass consists essentially of 35 to 50% $SiO_2$, 12 to 16% $K_2O$, 4 to 8% $Na_2O$, the total $K_2O$ and $Na_2O$ being 18 to 22%, 30 to 40% PbO, 1.1 to 1.5% $CeO_2$ free of oxides of neodymium and praseodymium, and up to 2% $Al_2O_3$.

Variations in the proportions of the constituents of the new glasses should be confined within the limits set forth above for the following reasons:

With an excess of $SiO_2$ or a deficiency of PbO or of PbO and BaO the density of the glass and its gamma-ray absorption are too low. The density of the glass is also too low if the total divalent metal oxide content is too low. On the other hand a deficiency of $SiO_2$ or an excess of PbO, BaO, or PbO and BaO objectionably increases the color due to $CeO_2$.

Such an increase in the color of the glass also results from a deficiency of $K_2O$ or an excess of $CeO_2$. With insufficient $CeO_2$ the glass becomes darkened by the gamma-radiation and loses its transparency. The presence of oxides of neodymium and praseodymium in the $CeO_2$ should be avoided because the coloring effect of oxides of neodymium and praseodymium further decreases the visible transmission of the glass and renders it unsuitable for the present purpose.

An objectionably low chemical durability or low resistance to attack by atmospheric moisture and other reagents with which the glass may come in contact results from an excessive amount of $K_2O$, $Na_2O$, or $B_2O_3$, while an excess of $Li_2O$ raises the liquidus of the glass objectionably and an excess of $Al_2O_3$ raises its viscosity to an undesirable extent.

By way of example the following compositions, calculated from their batches in weight percent on the oxide basis, illustrate glasses falling within the scope of this invention:

| | 1 | 2 | 3 | 4 | 5 | 6 | 7 | 8 |
|---|---|---|---|---|---|---|---|---|
| $SiO_2$ | 44.4 | 44.5 | 39.7 | 44.2 | 39.5 | 39.5 | 39.4 | 44.4 |
| $K_2O$ | 13.8 | 14.8 | 20 | 19.7 | 13.8 | 19.7 | 24.7 | 9.8 |
| $Na_2O$ | 6 | 4 | --- | --- | 6 | --- | --- | 9.8 |
| $Li_2O$ | --- | 1 | --- | --- | --- | --- | --- | --- |
| PbO | 32.5 | 32.6 | 20 | 32.4 | 39.4 | 39.5 | 32.6 | 29.7 |
| BaO | --- | --- | 20 | --- | --- | --- | --- | --- |
| $CeO_2$* | 1.3 | 1.1 | 1.3 | 1.7 | 1.3 | 1.3 | 1.3 | 1.3 |
| $Al_2O_3$ | 2 | 2 | --- | 2 | --- | --- | 2 | --- |
| $B_2O_3$ | --- | --- | --- | --- | --- | --- | --- | 5 |
| Density | 3.27 | 3.27 | 3.39 | 3.24 | 3.52 | 3.50 | 3.26 | 3.1 |

*Free of oxides of neodymium and praseodymium.

While it is not desirable that the density of the glass be less than that of the concrete with which it is used, densities greater than that of the concrete are not objectionable on account of the additional protection against radiation thereby obtained.

Those skilled in the art of making and working glass will understand that glass compositions within the scope of this invention may be melted in accordance with the teachings of the article entitled "The Technique of Optical Glass Melting" by Clarence N. Fenner, Jour. Am. Ceram. Soc., volume 2, at pages 115-120, 1919; and cast into plates or sheets in accordance with "Modern Glass Practice" by Samuel R. Scholes, 1946 at pages 143-146.

I claim:

1. A gamma ray absorptive glass consisting essentially of 35% to 50% $SiO_2$, 10% to 25% $K_2O$, 0% to 15% $Na_2O$, and 0% to 3% $Li_2O$, the total of the alkali metal oxides being 17% to 25%, 15% to 45% PbO, 0% to 25% BaO, 0% to 5% CdO, 0% to 10% SrO, 0% to 5% ZnO, 0% to 10% CaO, and 0% to 5% MgO, the total PbO+BaO being at least 25%, the total of the divalent metal oxides being not over 45%, and 0.8% to 1.8% $CeO_2$, the total of the essential oxides being at least 90%, the remainder, if any, consisting of compatible oxides which do not materially change the fundamental character of the glass, said glass being free of oxides of neodymium and praseodymium.

2. A gamma ray absorptive glass according to claim 1 which contains up to 5% $Al_2O_3$.

3. A gamma ray absorptive glass according to claim 1 which contains up to 10% $B_2O_3$.

4. A gamma ray absorptive glass according to claim 1 in which the alkali metal oxide consists of 17% to 25% $K_2O$.

5. A gamma ray absorptive glass according to claim 4 in which the divalent metal oxides consist of at least 15% PbO and not over 25% BaO.

6. A gamma ray absorptive glass consisting essentially of 35 to 50% $SiO_2$, 12 to 16% $K_2O$, 4 to 8% $Na_2O$, the total $K_2O$ and $Na_2O$ being 18 to 22%, 30 to 40% PbO, 1.1 to 1.5% $CeO_2$ free of oxides of neodymium and praseodymium, and up to 2% $Al_2O_3$.

7. A gamma ray absorptive glass consisting of about 44.4 $SiO_2$, 13.8% $K_2O$, 6% $Na_2O$, 32.5% PbO, 1.3% $CeO_2$ free of oxides of neodymium and praseodymium, and 2% $Al_2O_3$, the glass having a density of about 3.3.

8. A gamma ray absorptive glass consisting essentially of 35% to 50% $SiO_2$, 10% to 25% $K_2O$, 0% to 15% $Na_2O$, and 0% to 3% $Li_2O$, the total of the alkali metal oxides being 17% to 25%, 15% to 45% PbO, 0% to 25% BaO, 0% to 5% CdO, 0% to 10% SrO, 0% to 5% ZnO, 0% to 10% CaO, and 0% to 5% MgO, the total PbO+BaO being at least 25%, the total of the divalent metal oxides being not over 45%, and 0.8% to 1.8% $CeO_2$, the total of the essential oxides being at least 90%, the remainder, if any, consisting of compatible oxides which do not materially change the fundamental character of the glass, characterized by the glass being free of the oxides of neodymium and praseodymium.

References Cited in the file of this patent

UNITED STATES PATENTS

| | | |
|---|---|---|
| 1,633,534 | Long | June 21, 1927 |
| 1,726,635 | Taylor | Sept. 3, 1929 |
| 2,100,391 | Grimm et al. | Nov. 30, 1937 |
| 2,389,305 | Goodwin | Nov. 20, 1945 |
| 2,465,084 | Greiner | Mar. 22, 1949 |
| 2,477,329 | Gier et al. | July 26, 1949 |
| 2,579,709 | Smith et al. | Dec. 25, 1951 |
| 2,762,713 | Davis et al. | Sept. 11, 1956 |

FOREIGN PATENTS

| | | |
|---|---|---|
| 452,030 | Italy | 1949 |
| 632,906 | Great Britain | 1949 |

OTHER REFERENCES

"Introduction to Nuclear Engineering" by Stephenson, pages 350 and 351, published 1954.